United States Patent
Gan et al.

(10) Patent No.: US 7,854,417 B2
(45) Date of Patent: Dec. 21, 2010

(54) HEIGHT ADJUSTABLE STAND

(75) Inventors: Wen-Lin Gan, Shenzhen (CN); Yi-Qing Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 93 days.

(21) Appl. No.: 12/192,078

(22) Filed: Aug. 14, 2008

(65) Prior Publication Data

US 2009/0189048 A1 Jul. 30, 2009

(30) Foreign Application Priority Data

Jan. 30, 2008 (CN) .................. 2008 1 0300270

(51) Int. Cl.
*F16M 11/00* (2006.01)
(52) U.S. Cl. ............... 248/161; 248/919; 248/157; 248/122.1
(58) Field of Classification Search ......... 248/917–923, 248/176.1, 161, 404, 157, 122.1, 178.1
See application file for complete search history.

(56) References Cited

U.S. PATENT DOCUMENTS

| 6,062,148 | A * | 5/2000 | Hodge et al. ............. 108/147 |
| 6,378,446 | B1 * | 4/2002 | Long ....................... 108/147 |
| 7,185,868 | B2 * | 3/2007 | Wang ....................... 248/422 |
| 7,621,490 | B2 * | 11/2009 | Tseng ....................... 248/157 |
| 7,628,371 | B2 * | 12/2009 | Gan et al. .................. 248/422 |
| 2006/0145036 | A1 * | 7/2006 | Jones et al. ............. 248/188.5 |

* cited by examiner

*Primary Examiner*—Terrell Mckinnon
*Assistant Examiner*—Daniel J. Breslin
(74) *Attorney, Agent, or Firm*—Zhigang Ma

(57) ABSTRACT

An exemplary stand (60) includes a housing (610), an adjustable base (68), a pulley (630), a sleeve (635), a rotating member (636), a resilient member (632), a sliding member (62), and a cable. The adjustable base is fixed to one end of the housing. The adjustable base has a driving component (681), a follower (682), and a rotation shaft (683). The driving component is configured to rotate the follower. The rotation shaft is fixed to the follower. The pulley is rotatably connected to the housing. The sleeve is slidably disposed on the housing, and engages the rotation shaft. The rotating member is rotatably received in the sleeve. The resilient member is fixed to the adjustable base. The cable partially coils around the pulley, and connects the resilient member to the rotating member. A sliding member is slidably connected to the housing and fixed to the cable.

18 Claims, 9 Drawing Sheets

HEIGHT ADJUSTABLE STAND

BACKGROUND OF THE INVENTION

1. Field of the Invention

The present invention relates generally to a height-adjustable stand that can be used for supporting an object such as a display device.

2. Discussion of the Related Art

Liquid crystal display (LCD) devices are gradually replacing conventional cathode ray tube (CRT) devices because LCD devices have excellent display quality and are thinner and lighter than CRT devices. Due to their different structures and weights, stands designed for supporting conventional CRT devices are not suitable for LCD devices. Stands used for supporting LCD devices, including height-adjustable stands, have different requirements and specifications.

Referring to FIG. 9, a typical stand 100 for an LCD device includes a first stand unit 10, a second stand unit 20, a spring 30, a shaft 31, and four fastening members 33. The first stand unit 10 includes a base plate 11 and two side plates 12 extending perpendicularly from opposite sides of the base plate 11. A flange 13 is formed around an end of each side plate 12, with the two flanges 13 opposite to the base plate 11. The base plate 11, the side plates 12, and the flanges 13 cooperatively define a receiving groove 14. Two guide rails 15 are formed at the inner surfaces of the two side plates 12 respectively. Each of the flanges 13 defines a fixing hole 131 adjacent to an end thereof. The second stand unit 20 is movably seated in the first stand unit 10. The second stand unit 20 has a connecting portion 21 on a top side thereof, providing connection to an LCD panel of the LCD device. The connecting portion 21 defines two positioning holes 22 at a bottom side thereof. The shaft 31 defines two through holes 311 in opposite ends thereof. An end of the spring 30 is seated on the shaft 31, and the other end of the spring 30 defines two through holes 32.

During assembly of the stand 100, the second stand unit 20 is inserted into the first stand unit 10. Each fastening member 33 extends through one corresponding through hole 311 of the shaft 31 and one corresponding fixing hole 131 of the flanges 13, thus fixing the shaft 31 to the first stand unit 10. Each fastening member 33 extends through one corresponding through hole 32 of the spring 30 and one corresponding positioning hole 22 of the second stand unit 20, thus fixing the spring 30 to the second stand unit 10. In use, the second stand unit 20 can slide in the first stand unit 10 by application of an external force. When the external force is removed, the LCD panel connected to the second stand unit 20 can remain at a desired position, because a sum weight of the LCD panel and the second stand unit 20 is equal to a sum an elastic force produced by the spring 30 and a friction force between the second stand unit 20 and the first stand unit 10. That is, the LCD panel can be maintained in the desired position by the balance between the opposing forces.

However, a height of the LCD panel fixed to the stand 100 can be adjusted with only limited precision. The LCD my need to be to slidably repositioned many times, in order to achieve a desired position. The LCD device with the stand 100 thus proves inconvenient for use.

Therefore, a stand for a display device to solve the aforementioned problems is desired.

SUMMARY

An exemplary stand includes a housing, an adjustable base, a pulley, a sleeve, a rotating member, a resilient member, a sliding member, and a cable. The adjustable base is fixed to one end of the housing. The adjustable base has a driving component, a follower, and a rotation shaft. The driving component is configured to rotate the follower. The rotation shaft is fixed to the follower. The pulley is rotatably connected to the housing. The sleeve is slidably disposed on the housing, and engages with the rotation shaft. The sleeve is configured to slide along the housing when the follower is rotated. The rotating member is rotatably received in the sleeve. The resilient member is fixed to the adjustable base. The cable partially coils around the pulley, and connects the resilient member to the rotating member. The sliding member is slidably connected to the housing and fixed to the cable.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present stand for a display device. Moreover, in the drawings, like reference numerals designate corresponding parts throughout the several views.

DETAILED DESCRIPTION OF THE EMBODIMENTS

Figure 1:
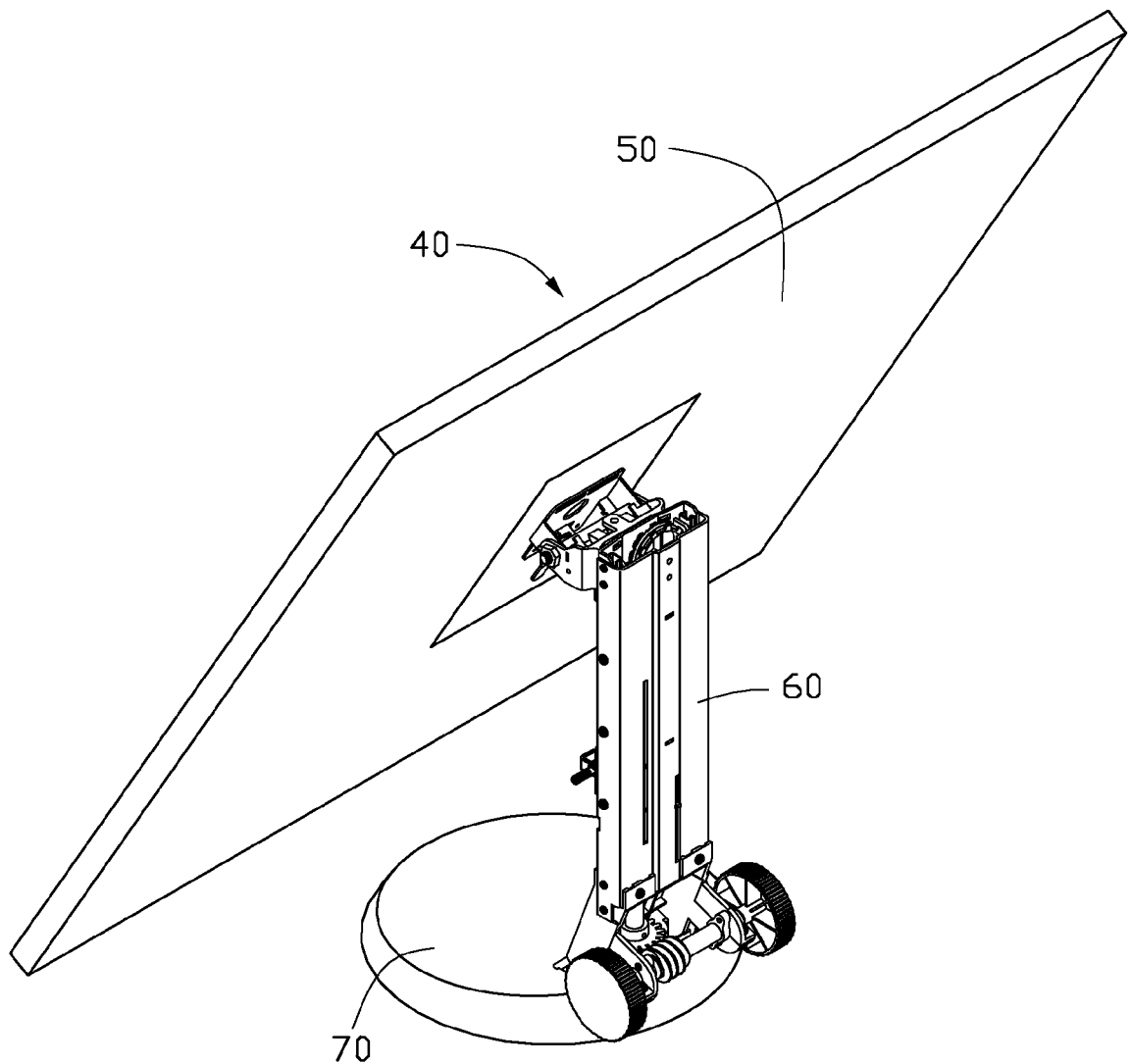
FIG. 1 is an isometric view of an LCD device using a stand in accordance with a preferred embodiment of the present invention.

A stand according to a preferred embodiment of the present invention is applicable for use with a display device such as a liquid crystal display (LCD) device. Referring to FIG. 1, the LCD device 40 includes an LCD panel 50, a pedestal 70, and a stand 60 for connecting the LCD panel 50 to the pedestal 70.

Figure 2:
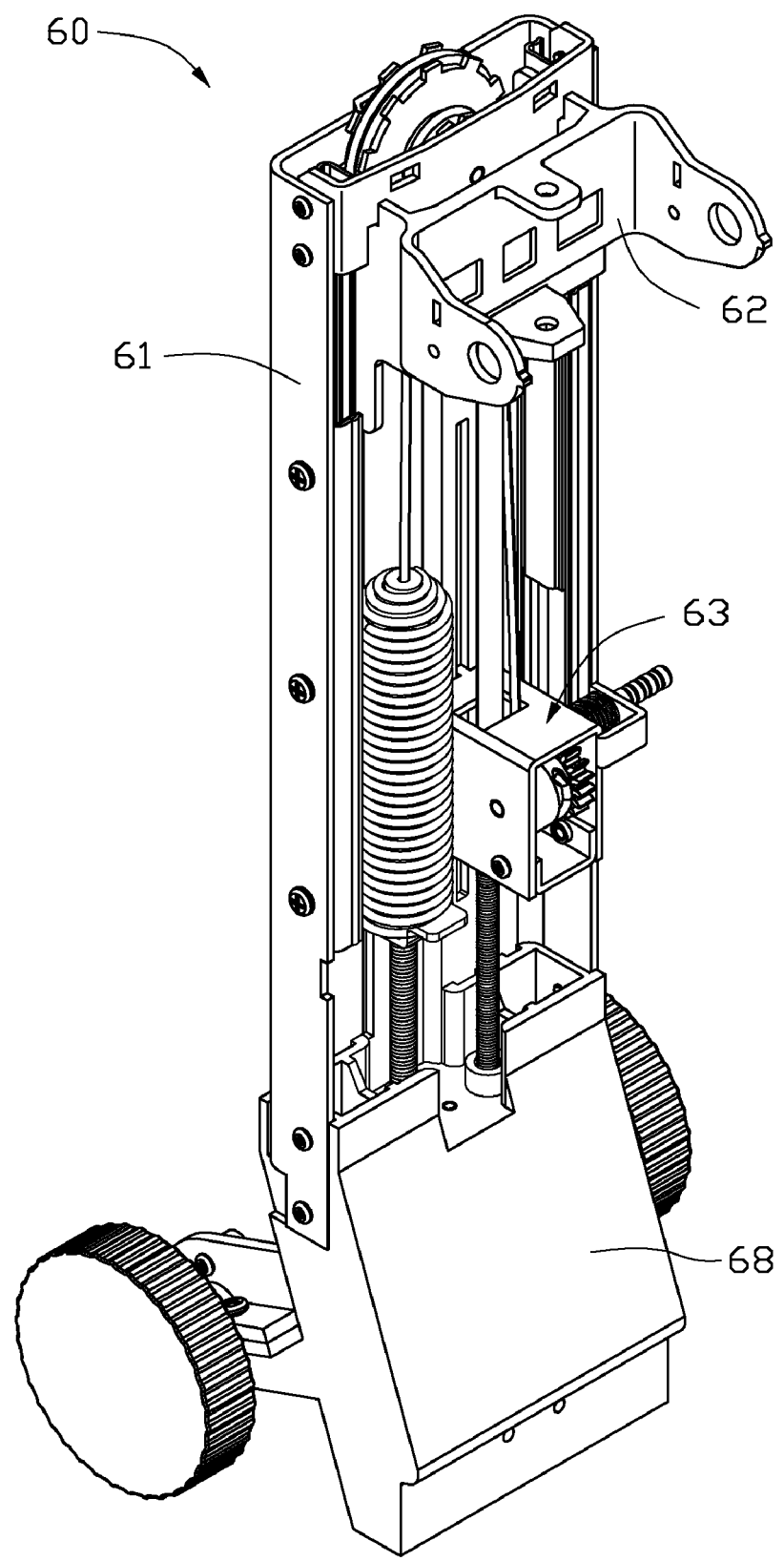
FIG. 2 is an assembled, isometric view of the stand of FIG. 1.

Referring to FIG. 2, the stand 60 includes a support unit 61, a sliding member 62, a height-adjustable subassembly 63, and an adjustable base 68.

Figure 3:
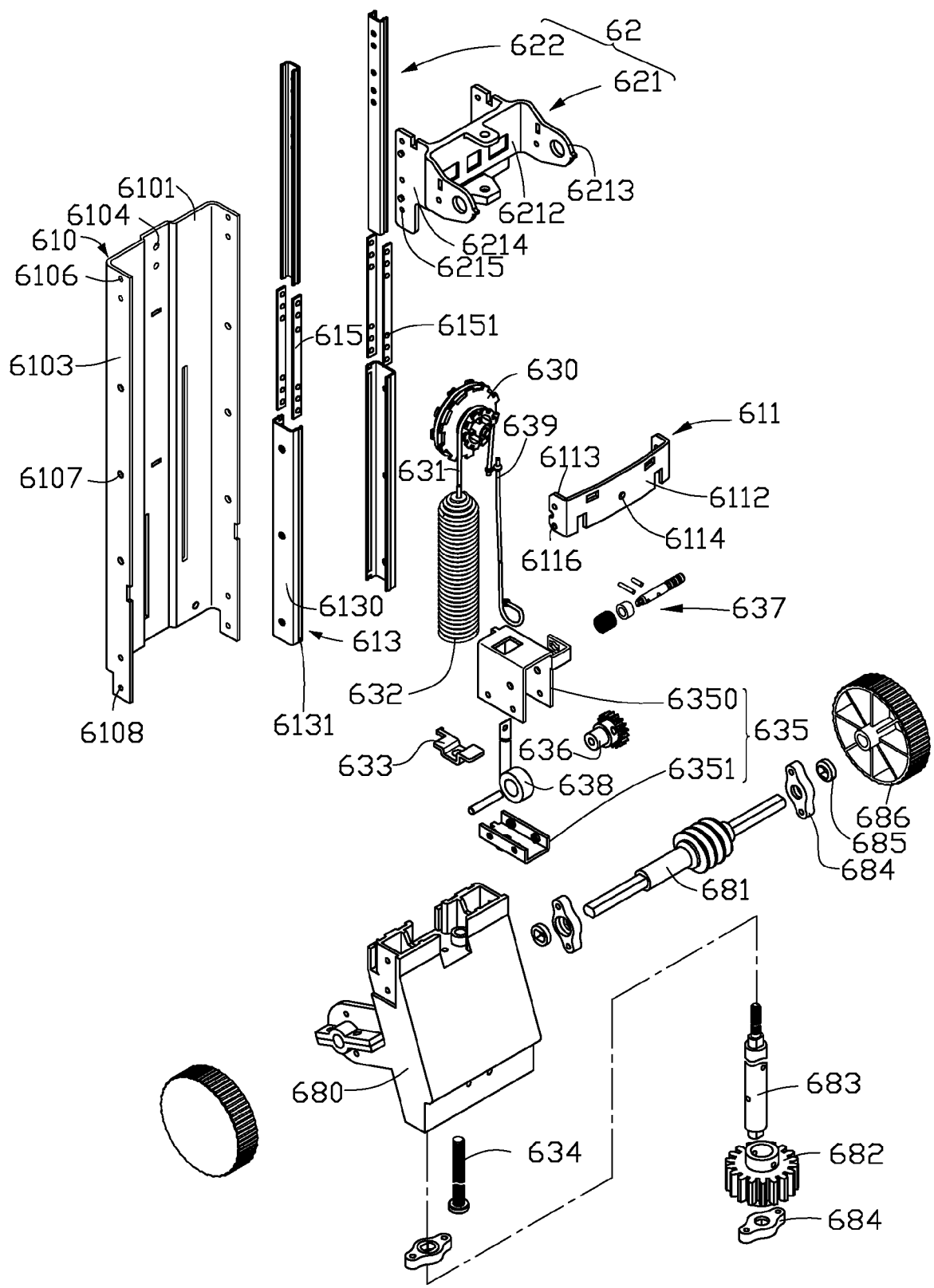
FIG. 3 is an exploded, isometric view of the stand of FIG. 2.
Figure 4:
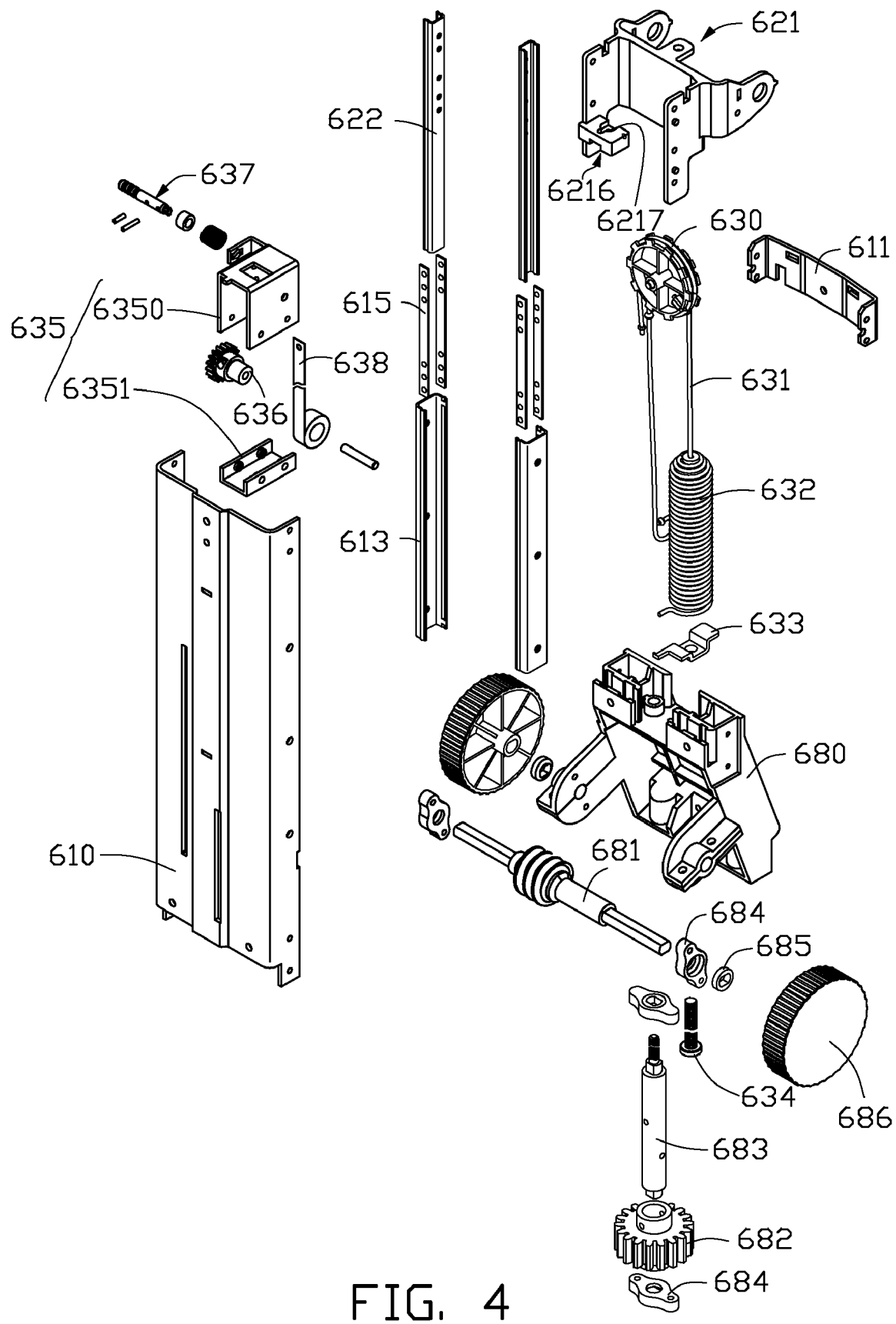
FIG. 4 is an exploded, isometric view of the stand of FIG. 2 viewed from another aspect.

Referring to FIGS. 3 and 4, the support unit 61 includes a housing 610, a positioning piece 611, two guide rails 613, four friction members 615, and a plurality of fastening members (not shown). The housing 61 includes a base plate 6101 and two side plates 6103 extending substantially perpendicularly from opposite sides of the base plate 6101. The base plate 6101 defines two fixing holes 6104 adjacent to the top end. Each side plate 6103 defines two fixing holes 6106 adjacent to the top end, three threaded holes 6107 in the middle portion, and two positioning holes 6108 adjacent to the bottom end. The positioning piece 611 includes a bottom plate 6112 and two side plates 6113 extending substantially perpendicularly from opposite sides of the bottom plate 6112.

A center of the bottom plate 6112 defines a through hole 6114. Each side plate 6113 defines two fixing holes 6116 corresponding to the fixing holes 6106 of the housing 610. The guide rail 613 includes a flat plate 6130 and two side plates 6131 extending substantially perpendicularly from opposite sides of the flat plate 6130. The guide rail 612 is configured to be fixed to the middle portion of the side plates 6103 of the housing 610 via a plurality of fastening members. Each friction member 615 is strip-shaped. Three hemispherical protrusions 6151 are formed on opposite ends of each friction member 615. The friction members 615 are slidably attached to the side plate 6131 of the guide rail 613.

The sliding member 62 includes a frame 621 and two sliding strips 622. The frame 621 includes a main plate 6212, two side plates 6214, and two connecting pieces 6213. The side plates 6214 extend substantially perpendicularly from opposite sides of the base plate 6212. The connecting pieces 6213 extend away from the side plates 6214 from opposite sides of the base plate 6212. A socket 6216 is formed at a bottom end of one of the side plates 6214. The socket 6216 defines a depression 6217 on a top surface. A fixing hole (not shown) is defined in a bottom wall of the depression 6217. The sliding strips 622 are configured to be fixed to the side plates 6214 of the frame 621 correspondingly.

Figure 5:
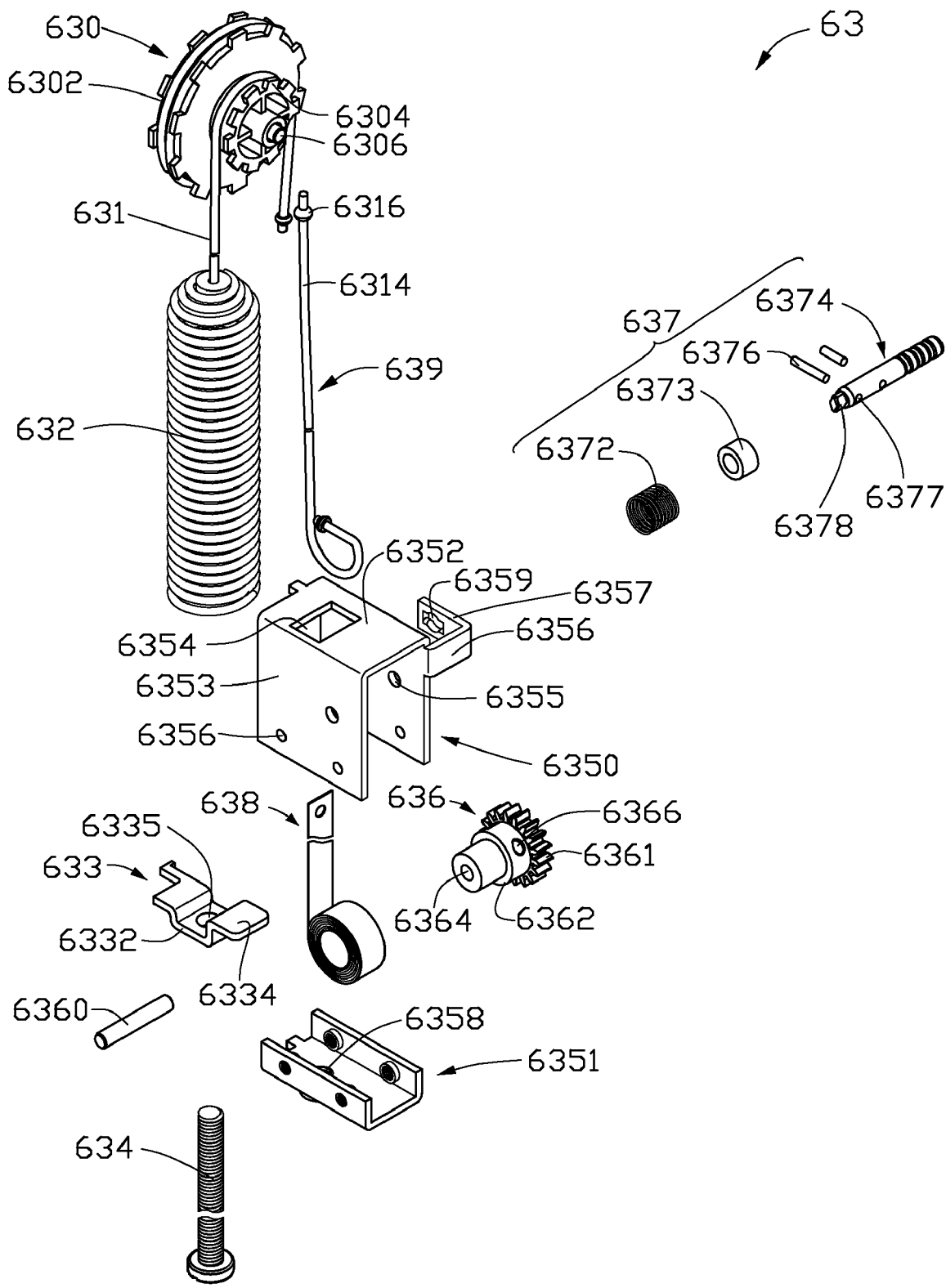
FIG. 5 is an exploded, isometric view of a height-adjustable subassembly of the stand of FIG. 2.

Referring also to FIG. 5, the height-adjustable subassembly 63 includes a fixed pulley 630, a first cable 631, a second cable 639, a spring 632, a positioning piece 633, a screw 634, a sleeve 635, a shaft gear 636, a switching member 637, and a coiled spring 638. The fixed pulley 630 includes a shaft 6306, a first wheel portion 6302 and a second wheel portion 6304. The first wheel portion 6302 and the second wheel portion 6304 are seated on the shaft 6306. The first cable 631 includes two fixing caps 6316 on opposite ends thereof. The second cable 639 also includes two fixing caps 6316 on opposite ends thereof. The positioning piece 633 includes a bottom plate 6332 and two side plates 6334 extending from opposite sides of the bottom plate 6332. A center of the bottom plate 6332 defines a threaded hole 6335. The side plates 6334 are configured to connect to the spring 632. The screw 634 is configured to engage in the threaded hole 6335 of the positioning piece 633.

The sleeve 635 includes a main portion 6350, a cover 6351, and a peg 6360. The main portion 6350 includes a base plate 6352 and two side plates 6353 extending from opposite sides of the base plate 6352. The base plate 6352 defines a rectangular through hole 6354. Each side plate 6353 defines a pivot hole 6355. A connecting piece 6356 is formed on one side of each side plate 6353. A positioning piece 6357 perpendicularly extends from an end of the connecting piece 6356. The positioning piece 6357 defines a positioning hole 6359. One of the side plates 6353 opposite/adjacent to the positioning piece 6357 also defines a through hole (not shown). The cover 6351 is configured to connect to a bottom end of the main portion 6350. A center of the cover 6351 defines a threaded hole 6358.

The shaft gear 636 includes a gear portion 6361 and a shaft portion 6362 extending from a center of the gear portion 6361. A center of the shaft gear 636 defines a pivotal hole 6364, engaging the peg 6360. An outer cylindrical surface adjacent to the gear portion 6361 of the shaft portion 6362 further defines a fixing hole 6366, engaging the fixing cap 6316 of the first cable 631.

The switching member 637 includes a spring 6372, a ring 6373, a pivotal shaft 6374, and two pegs 6376. The pivotal shaft 6374 defines two peg holes 6377 in an outer cylindrical surface. An insertion end 6378 is formed on an end of the pivotal shaft 6374, which is configured to engage the gear portion 6361. One end of the coiled spring 638 is configured to coil around the pivotal shaft 6374, and the other end of the coiled spring 638 is configured to connect to the socket 6216 of the frame 621.

Figure 6:
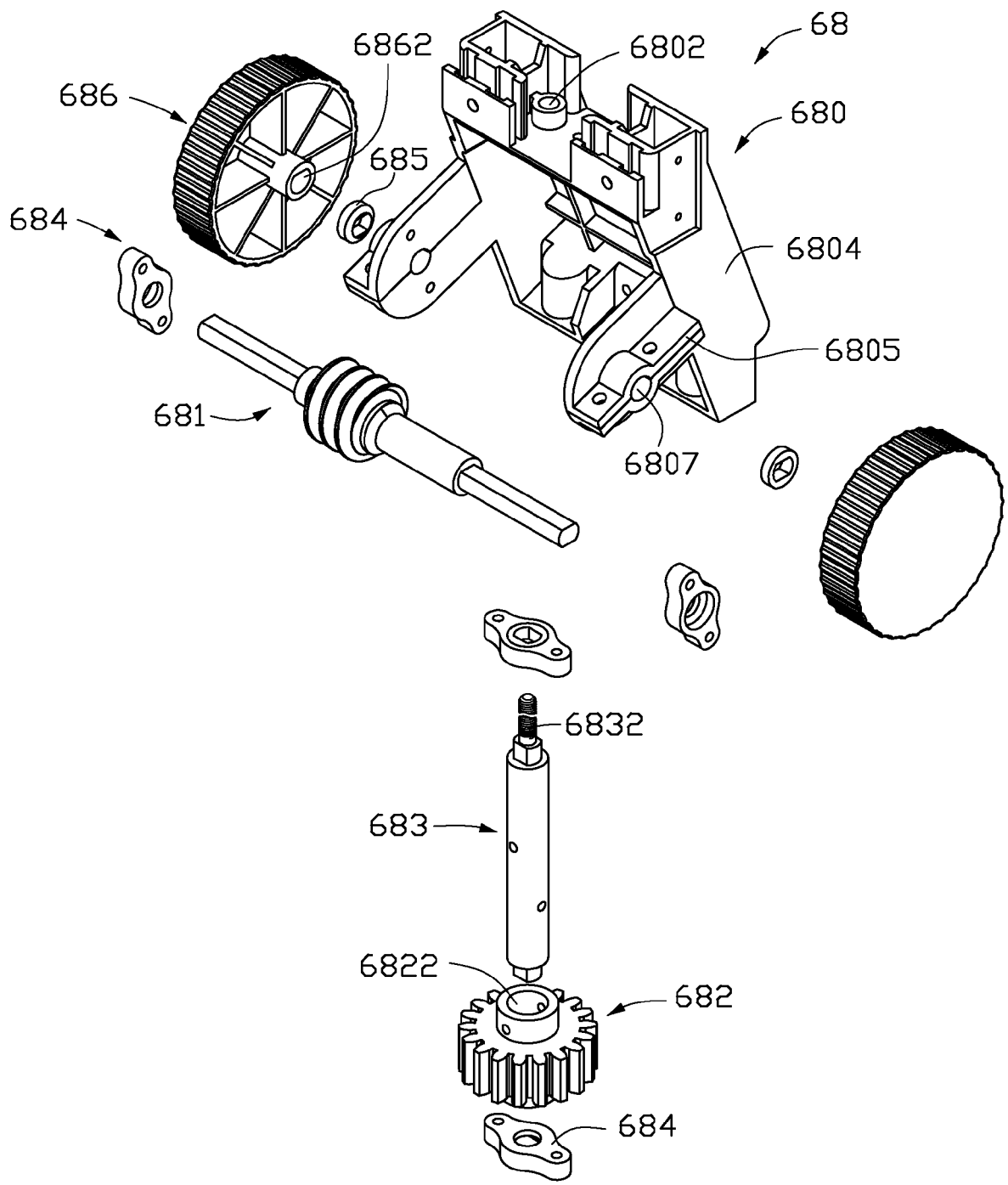
FIG. 6 is an exploded, isometric view of an adjustable base of the stand of FIG. 2.
Figure 7:
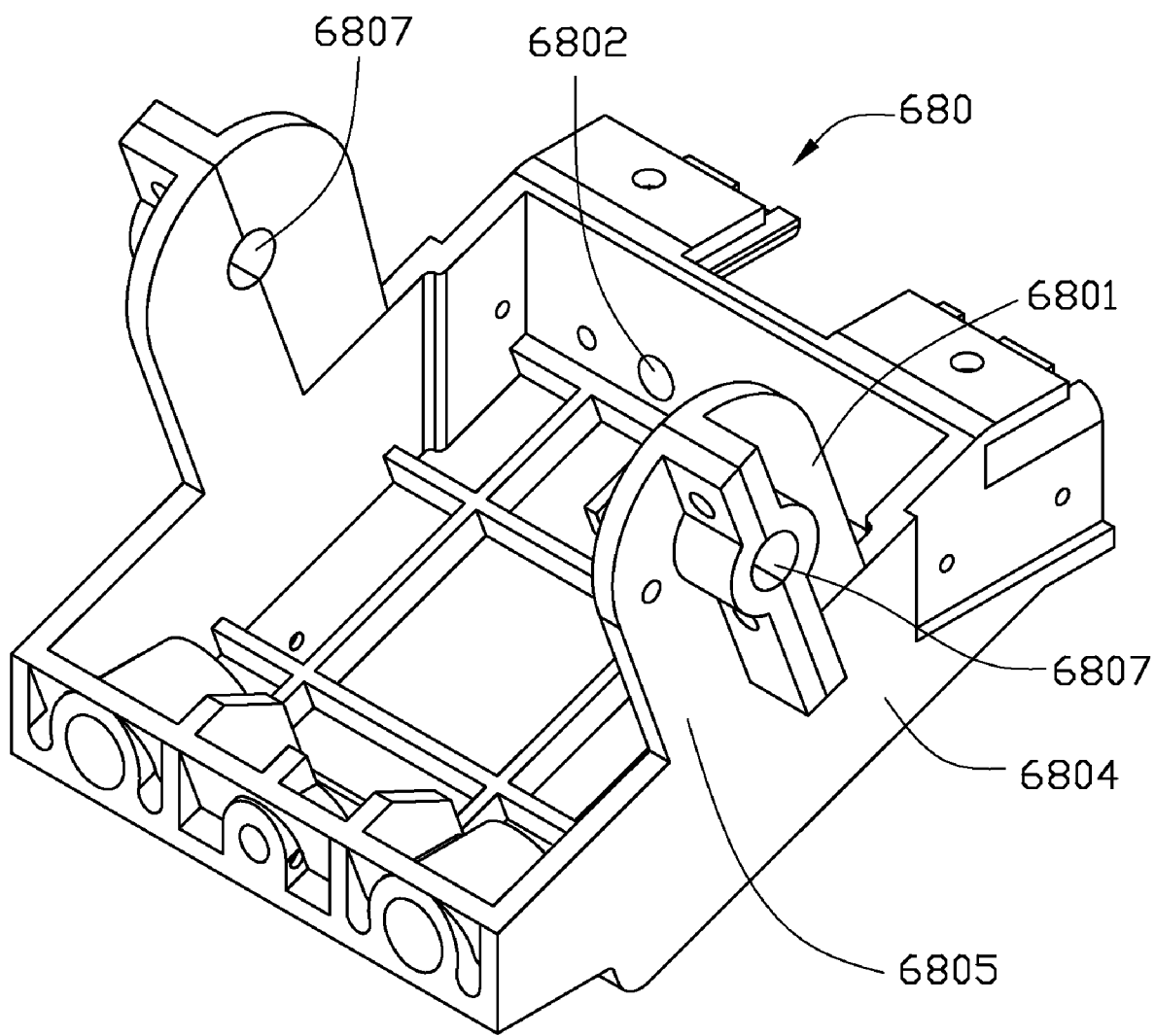
FIG. 7 is an exploded, isometric view of a frame of the stand of FIG. 6.

Referring to FIGS. 6 and 7, the adjustable base 68 includes a frame 680, a worm 681, a worm gear 682, a rotation shaft 683, four connecting members 684, two washers 685, and two knobs 686. The frame 680 includes a main body 6804 and two positioning members 6805 extending substantially perpendicularly from a middle portion of the main body 6804. The main body 6804 defines a pivotal hole 6801 and a through hole 6802 on the top end thereof. Each positioning member 6805 defines a fixing hole 6807. The worm 681 is configured to engage the worm gear 682. A threaded portion 6832 is formed on one end of the rotation shaft 683. The connecting members 684 are configured to sleeve on ends of the worm 681 and the rotation shaft 683. Each knob 686 is a cylinder in shape, and defines an assembling hole 6862 configured to non-rotatably receive an end of the rotation shaft 683.

Figure 8:
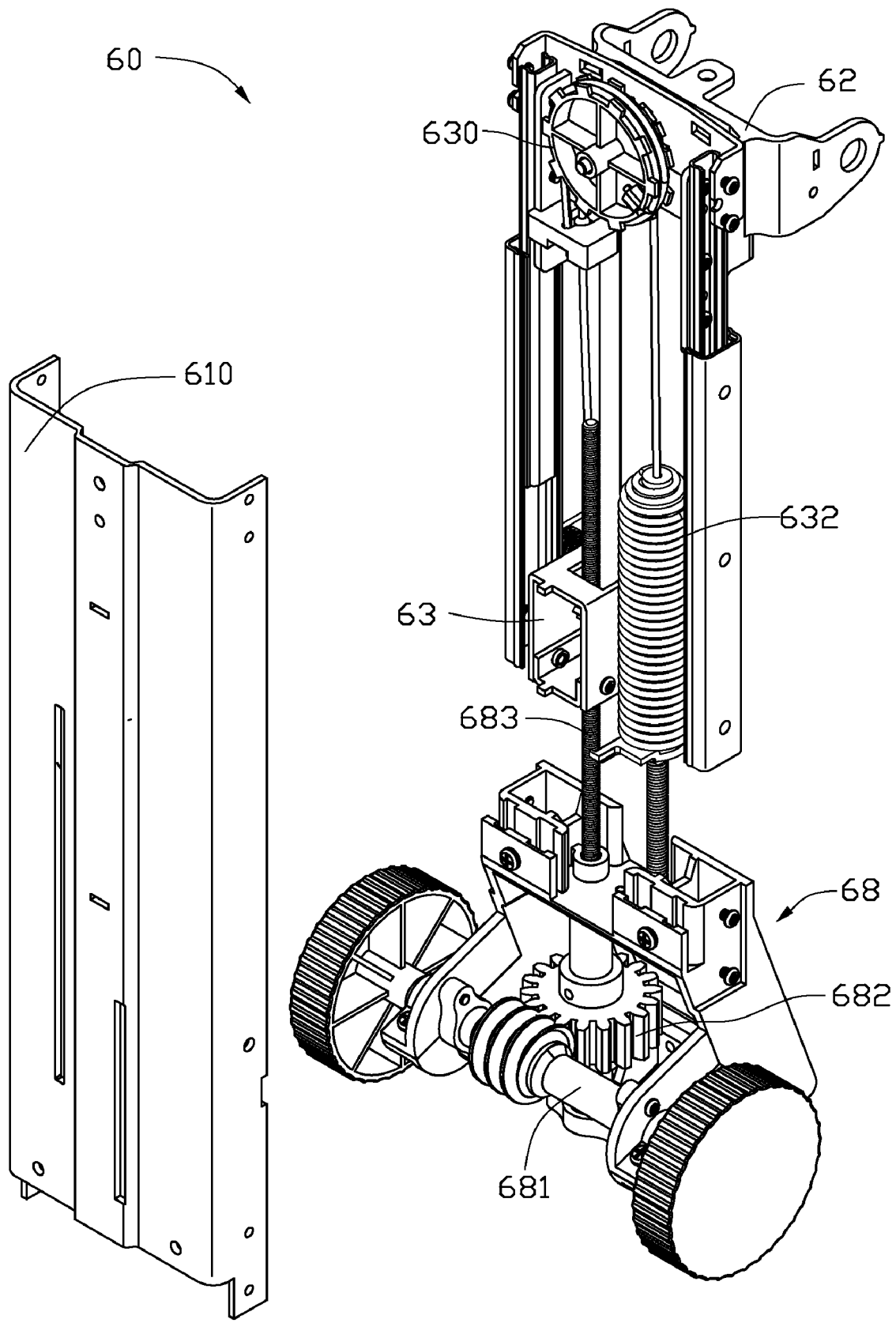
FIG. 8 is a partially exploded, isometric view of the stand of FIG. 2.
Figure 9:
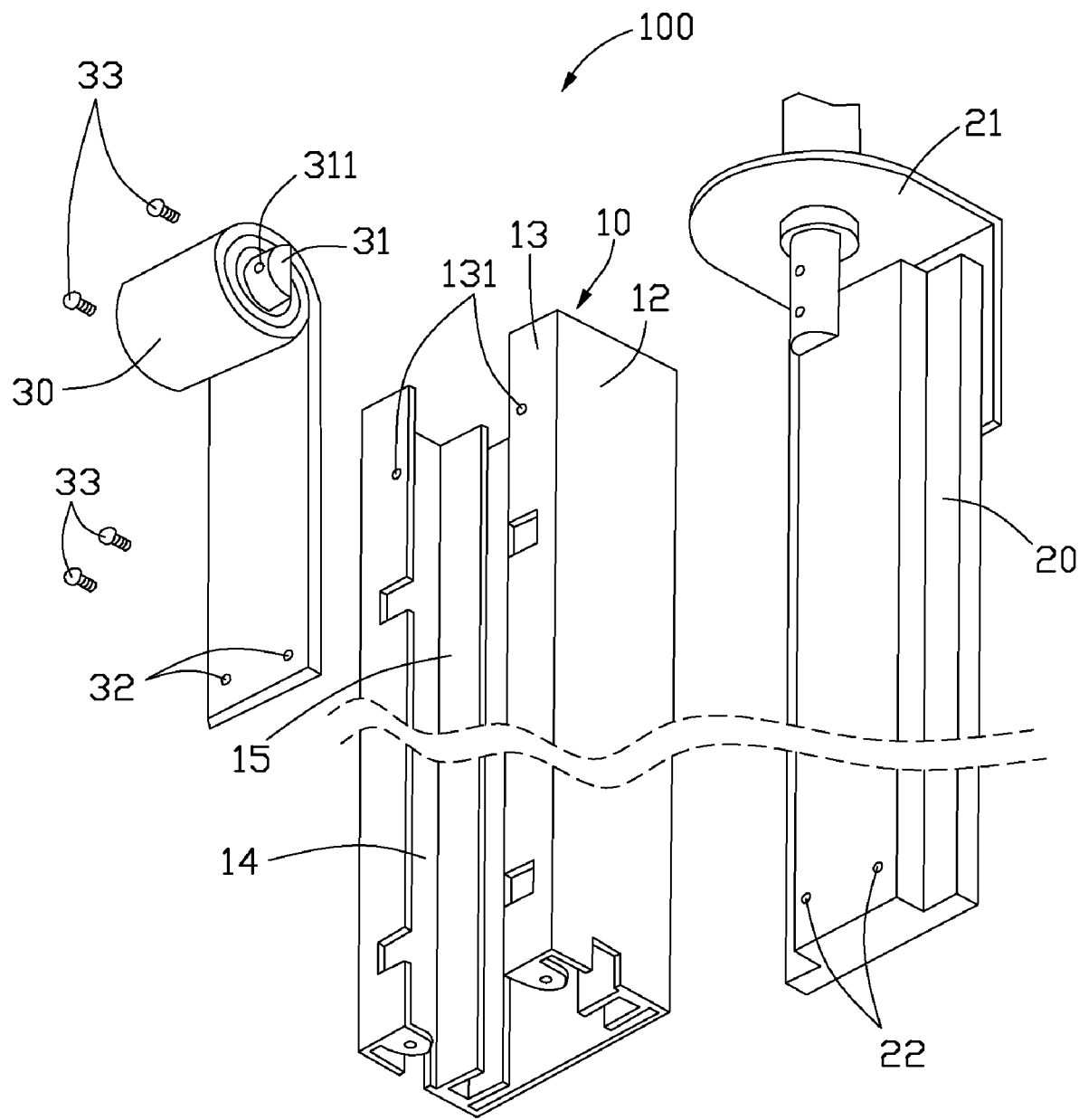
FIG. 9 is an exploded, isometric view of a conventional stand.

Referring to FIGS. 2 and 8, during assembly of the stand 60, the guide rails 613 are fixed to the side plates 6103 of the housing 610 correspondingly. One end of the shaft 6306 engages in the through hole 6114 of the positioning piece 611, and the other end of the shaft 6306 engages in the fixing hole 6104 of the housing 610, thus rotatably connecting the fixed pulley 630 to the housing 610. The fastening members extend through the fixing holes 6116 of the positioning piece 611 and the fixing holes 6106 of the housing 610 correspondingly, thereby fixing the positioning piece 611 to the housing 610.

The sliding strips 622 are fixed to side plates 6214 of the frame 621 correspondingly. The sliding strip 622 is received in the guide rail 613, and the friction members 615 are disposed between the sliding strips 622 and the guide rails 613. Thereby, the sliding member 62 is slidably connected to the guide rail 613.

The shaft portion 6362 of the shaft gear 636 protrudes through the coiled spring 638. The shaft gear 636 is disposed between the side plates 6353 of the main portion 6350. The peg 6360 extends through one of the side plates 6353 of the main portion 6350, the shaft gear 636, and the other side plate 6353 of the main portion 6350, thus rotatably connecting the shaft gear 636 to the main portion 6350. One end of the coiled spring 638 extends through the through hole 6354 of the main portion 6350, and is fixed to the socket 6216 of the frame 621. The spring 6372 is seated on the ring 6373. One of the pair of fixing caps 6316 of the first cable 631 is fixed to the spring 632, and the other is fixed to the socket 6216 of the frame 621. One of the fixing caps 6316 of the second cable 639 engages in the fixing hole 6366 of the shaft gear 636, and part of the second cable 639 coils around the shaft portion 6362. The other fixing cap 6316 of the second cable 639 engages in the fixing hole of the socket 6216 of the frame 621. The switching member 637 extends through the positioning hole 6359 of the positioning piece 6357, the ring 6373, and the through hole of the side plate 6353. The pegs 6376 engage in the peg holes 6377 of the pivotal shaft 6374 correspondingly after the pivotal shaft 6374 protrudes through the positioning hole 6359 of the positioning piece 6357. Thus, the pegs 6376 are located at opposite sides of the positioning piece 6357, and the spring 6372 is compressed between the positioning piece 6357 and the side plate 6353. The cover 6351 is fixed at the bottom end of the main portion 6350.

The frame 680 is fixed to a bottom of the housing 610. The screw 634 extends through the pivotal hole 6801 of the frame 680, the threaded hole 6335 of the positioning piece 633, and finally partially protrudes inside the spring 632. The side plates 6334 of the positioning piece 633 engage the spring 632. The threaded portion 6832 of the rotation shaft 683 extends through the through hole 6802 of the frame 680, the threaded hole 6358 of the cover 6351, and the through hole 6354 of the main portion 6350. The other end of the rotation shaft 683 extends through the worm gear 682, and engages the connecting member 684. Each end of the worm 681 extends through the fixing hole 6807 of one corresponding positioning member 6805, one corresponding connecting member 684, one corresponding ring 685, and engages the corresponding knob 686. Then, the worm 681 engages the worm gear 682. After the stand 60 is assembled, the sliding member 62 rests at the top of the housing 61, and the spring 632 is at rest. The LCD panel 50 is fixed to the sliding member 62. The LCD panel 50 can be adjusted in large and small increments via the stand 60.

The stand 60 has two adjustment modes, large increment and small increment. In the large increment adjusting process, external force is applied on the LCD panel 50, and the sliding member 62 with the LCD panel 50 attached thereto slides downwards on the housing 610. When the sliding member 62 slides downwards on the housing 610, because the spring 632 is connected to the frame 621 by the first cable 631, the spring 632 extends. As a result, the spring 632 produces an elastic force to resist movement of the sliding member 62. Furthermore, because the sliding member 62 is connected to the shaft gear 636 by the coiled spring 638 and the second cable 639, the coiled spring 638 further constricts the shaft gear 636. At a same time, the second cable 639 also further coils around the shaft gear 636. When the external force is released, the sliding member 62 remains in a predetermined position, due to the combined weight of the LCD panel 50 and the sliding member 62 counter balancing the combined forces of the elastic force of the extended spring 632, a resilient force of the coiled spring 638 coiled around the shaft gear 636, and a friction force between the housing 610 and the sliding member 62.

In the small increment adjusting process, the insertion end 6378 of the pivotal shaft 6374 is pushed into the sleeve 635 until it engages the gear portion 6361 of the shaft gear 636. Therefore, the shaft gear 636 is non-rotatably fixed on the rotation shaft 640, and the length of the second cable 63 coiled on the shaft gear 636 cannot be changed. The knobs 686 are driven to rotate, thereby driving the worm 681 to rotate. The worm gear 682 and the rotation shaft 683 are driven to rotate due to rotation of the worm 681. Because the worm 681 engages in the threaded hole 6358 of the sleeve 635, the sleeve 635 moves slowly along the axis of the worm 681. Thus, the sliding member 62 with LCD panel 50 attached thereto can be moved in small increments by the elastic force of the spring 632. That is, the LCD panel 50 can be adjusted with improved precision.

It should be understood that the worm 681 can be replaced by another kind of driving component such as a gear. Accordingly, the worm gear 682 can be replaced by other followers, such as a rack. The gear engages the rack. When the gear rotates, the rack correspondingly moves linearly. Because the gear and the rack respectively connect with the knob 686 and the sleeve 635, a rotation of the knob 686 is translated to a linear movement of the sleeve 635. In addition, the spring 632 can be another resilient member, such as a rubber band. The first cable 631 and the second cable 639 can be replaced by a cable connecting the spring 632 to the shaft gear 636, with the sliding member 62 fixed on the cable. Furthermore, the shaft gear 636 can be another kind of rotating member, such as a cylinder having a plurality of positioning holes therein. The positioning holes are configured to selectably receive the pivotal shaft 6374.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A stand, comprising:
   a housing;
   an adjustable base fixed to one end of the housing, the adjustable base having a driving component, a follower, and a rotation shaft, the driving component configured to rotate the follower, with the rotation shaft fixed to the follower;
   a pulley rotatably connected to the housing;
   a sleeve slidably disposed on the housing, and engaging with the rotation shaft, a rotation of the follower forcing the sleeve sliding along the housing, the sleeve comprising a main portion and a peg, the main portion comprising a base plate and two side plates extending from opposite sides of the base plate, the peg extending through the side plates, and the rotating member seating on the peg;
   a rotating member rotatably received in the sleeve;
   a resilient member fixed to the adjustable base;
   at least one cable partially coiling on the pulley, and connecting the resilient member to the rotating member, and
   a sliding member slidably connected to the housing and fixed to the cable.

2. The stand of claim 1, wherein the driving component is a worm, the follower is a worm gear, and the worm gear is engaged with the worm.

3. The stand of claim 2, wherein the adjustable base further comprises two knobs fixed to opposite ends of the worm.

4. The stand of claim 1, further comprising two guide rails, wherein the housing comprises a base plate with two side plates perpendicularly extended from opposite sides thereof, the guide rails are fixed to the side plates correspondingly, the sliding member comprises a frame and two sliding strips disposed at opposite sides of the frame, and the sliding strips engage the guide rails correspondingly, thus slidably connecting the sliding member to the housing.

5. The stand of claim 4, further comprising a plurality of friction members, disposed between the guide rail and the sliding strip.

6. The stand of claim 1, further comprising a coiled spring, one end thereof coiling on the rotating member, and the other end thereof fixed to the sliding member, the coiled spring thus capable of driving the rotating member to rotate relative to the sleeve when the sliding member moves relative to the housing.

7. The stand of claim 6, further comprising a switching member movably disposed on the sleeve, the switching member configured to engage the rotating member, thus rendering the rotating member non-rotatable relative to the sleeve.

8. The stand of claim 1, wherein the sleeve further comprises a cover, the cover is fixed to the main portion at the end away from the base plate, the cover defines a threaded hole, a threaded portion is formed on one end of the rotation shaft, and the threaded portion is engaged in the threaded hole of the cover.

9. The stand of claim 8, wherein the rotating member is a shaft gear, the shaft gear comprises a gear portion and a shaft portion extending from a center of the gear portion, and the shaft gear defines a through hole in a center thereof through which the peg extends.

10. The stand of claim 1, wherein the resilient member is a spring.

11. The stand of claim 1, wherein the at least one cable comprises a first cable and a second cable, the first cable connecting the resilient member to the sliding member, and the second cable connecting the sliding member to the rotating member.

12. A stand, comprising:
a housing;
a sliding member slidably disposed on the housing;
an adjustable base fixed to one end of the housing, the adjustable base comprising a driving component and a follower, the driving component configured to move the follower;
a sleeve slidably disposed on the housing, and connecting with the follower, with movement of the follower capable of sliding the sleeve along the housing, the sleeve comprising a main portion and a peg, the main portion comprising a base plate and two side plates extending from opposite sides of the base plate, the peg extending through the side plates, and the rotating member seating on the peg;
a rotating member received in the sleeve;
a resilient member fixed to the adjustable base;
at least one cable partially coiled on the pulley, configured to connect the resilient member to the rotating member; and
a height-adjustable subassembly connecting the sliding member to the adjustable base, the height-adjustable subassembly configured for adjusting a position of the sliding member relative to the housing.

13. The stand of claim 12, wherein the driving component is a worm, the follower is a worm gear, and the worm gear engages the worm.

14. The stand of claim 12, further comprising a coiled spring, one end of the coiled spring coiling on the rotating member, and the other end of the coiled spring fixed to the sliding member, the coiled spring thus capable of driving the rotating member to rotate relative to the sleeve when the sliding member moves relative to the housing.

15. The stand of claim 12, further comprising a switching member movably disposed on the sleeve, the switching member configured to engage the rotating member, thus rendering the rotating member non-rotatable relative to the sleeve.

16. The stand of claim 12, wherein the sleeve further comprises a cover, the cover is fixed to the main portion at the end away from the base plate, the cover defines a threaded hole, and a threaded portion is located on one end of the rotation shaft and is engaged in the threaded hole of the cover.

17. The stand of claim 16, wherein the rotating member is a shaft gear, the shaft gear comprises a gear portion and a shaft portion extending from a center of the gear portion, and the shaft gear defines a through hole in a center thereof through which the peg extends.

18. A stand, comprising:
a housing;
a sliding member slidably disposed on the housing;
an adjustable base fixed to one end of the housing, the adjustable base configured to adjust a position of the sliding member relative to the housing;
a sleeve slidably disposed on the housing, the sleeve comprising a main portion and a peg, the main portion comprising a base plate and two side plates extending from opposite sides of the base plate, the peg extending through the side plates, and the rotating member seating on the peg; and
a height-adjustable subassembly, comprising:
a pulley rotatably connected to the housing;
a resilient member fixed to the adjustable base; and
at least one cable partially coiled on the pulley and connecting the resilient member to the sliding member.

* * * * *